(12) United States Patent
Taurand

(10) Patent No.: US 7,446,521 B2
(45) Date of Patent: Nov. 4, 2008

(54) DC DC VOLTAGE BOOST CONVERTER

(75) Inventor: Christophe Taurand, Valence (FR)

(73) Assignee: Thales (FR)

( * ) Notice: Subject to any disclaimer, the term of this patent is extended or adjusted under 35 U.S.C. 154(b) by 0 days.

(21) Appl. No.: 11/950,479

(22) Filed: Dec. 5, 2007

(65) Prior Publication Data

US 2008/0129258 A1 Jun. 5, 2008

(30) Foreign Application Priority Data

Dec. 5, 2006 (FR) .................................. 06 10605

(51) Int. Cl.
G05F 1/40 (2006.01)
H02M 3/18 (2006.01)
(52) U.S. Cl. ..................... 323/288; 323/272; 363/59
(58) Field of Classification Search ............... 363/59,
363/60; 323/222, 225, 271, 272, 282, 284,
323/285, 288, 290; 327/536
See application file for complete search history.

(56) References Cited

U.S. PATENT DOCUMENTS

| 5,636,108 | A | 6/1997 | Taurand |
| 5,745,351 | A | 4/1998 | Taurand |
| 6,121,768 | A | 9/2000 | Taurand |
| 6,285,568 | B1 | 9/2001 | Taurand |
| 6,400,210 | B2 * | 6/2002 | Myono ........................ 327/536 |
| 7,199,564 | B2 | 4/2007 | Taurand |
| 7,382,176 | B2 * | 6/2008 | Ayres et al. .................... 363/60 |

FOREIGN PATENT DOCUMENTS

FR 2860660 4/2005
WO 2005/039033 4/2005

OTHER PUBLICATIONS

List of related cases.

* cited by examiner

*Primary Examiner*—Jessica Han
(74) *Attorney, Agent, or Firm*—Lowe Hauptman Ham & Berner, LLP

(57) ABSTRACT

A high-output ratio DC DC converter supplies at least two regulated output voltages, a positive voltage Vs+ and a negative voltage Vs− from a direct current voltage Vin applied at the input, by means of two voltage boost structures with pairs of switches SBp1, SHp1, and groups of input capacitors Gin1 and output capacitors Gout1, controlled by an inductive stage with inductance Lin and controlled switch M, a level translator circuit with capacitor Ct and direct diode Dt being provided between the said inductive stage and the structure supplying the negative output voltage.

15 Claims, 8 Drawing Sheets

US 7,446,521 B2

DC DC VOLTAGE BOOST CONVERTER

RELATED APPLICATIONS

The present application is based on, and claims priority from, French Application Number 06 10605, filed Dec. 5, 2006, the disclosure of which is hereby incorporated by reference herein in its entirety.

FIELD OF THE INVENTION

The present invention relates to a direct current direct current or DC DC converter, of the voltage boost type, making it possible to obtain a direct current output voltage of a higher value than the supply direct current voltage applied at the input. The field of application relates to the low cost and high performance conversion of energy, in particular with very high output ratio. Such DC DC converters are in particular used in the aviation field to generate high level electric voltages, to supply electronic devices, from a common low voltage supply generator.

A DC DC voltage boost converter is an uninsulated switched-mode converter, that comprises an input inductor connected between a direct current voltage supply line and the earth, through a controlled switch, typically a switch-controlled transistor, and one or more voltage boost stages.

When the aim is to obtain high conversion rates, with a high output ratio and high reliability and service life, it is necessary to define particular topologies, particularly for managing the stress due to the high voltages and the currents generated.

Also in certain applications, such as aviation, the aim is to obtain a low cost and high performance DC DC energy conversion, in particular at a very high output ratio, for example at least equal to 5.

BACKGROUND OF THE INVENTION

French patent FR 2 860 660 delivered on 21 Jan. 2006 teaches in particular of converters whose topology with groups of capacitors makes it possible to spread the stress over the various switches and to obtain very high voltages, with an optimal output ratio. In a practical example, it is possible therefore to obtain an output voltage of the order of 270 volts from an input voltage of 12 volts, or a boost ratio much greater than 5.

SUMMARY OF THE INVENTION

The structure of such a voltage boost converter, for supplying a high positive voltage according to this prior art is shown in FIG. 1a.

A generator supplies a direct current voltage Vin to input terminals E1 and E2 of the converter.

The converter comprises:
an input inductor Lin connected in series between the input terminals E1 and E2 via a switch SB, which periodically places the input inductor in parallel with the generator.
an output capacitor Cout connected in parallel to the output terminals Out1 and Out2.
two pairs of switches $P_0$ and $P_1$, associated with an input capacitor Ce and an output capacitor Cs. Usually Ce=Cs=C.
More precisely, each pair comprises two switches connected in series. The pair $P_0$ therefore comprises the switches SB and SH connected in series between the terminal E2 and a connection node $A_1$. The pair $P_1$ comprises the switches $SB_1$ and $SH_1$ connected in series between the connection node $A_1$ and the output terminal Out1. The load capacitor Ce is connected in parallel between the connection nodes $A_0$ and $A_2$ of the switches of the two successive pairs $P_0$ and $P_1$, $A_0$ being the connection node between the switches SB and SH of the pair $P_0$ and $A_2$, the connection node between the switches $SB_1$ and $SH_1$ of the pair $P_1$.

The output filtering capacitor Cs is connected in parallel to the second pair $P_1$, between the node $A_1$ and the terminal Out1.

The operating principle is briefly as follows:

The switches SB and $SB_1$ are controlled by the same control signal S2, and the switches SH and $SH_1$ are controlled by the same control signal S1. The control signals S1 and S2 are such that, in each pair, the switches are controlled simultaneously, one to an on-state resulting from the application at its control input of a first control signal S1, the other to an off-state by the application at its control input of a second control signal S2 complementing the first. The switches SB and $SB_1$ are therefore controlled to the on-state (closed) for a time Ton and to the open state for a time Toff, while the switches SH and $SH_1$ are controlled to the on-state (closed) for a time Toff and to the open state for a time Ton.

Preferably, a recovery inductor $Lr_1$ is provided in series with the switch SB1 of the pair $P_1$, so that the capacitor Ce is in parallel on the whole series SH, $SB_1$, $Lr_1$. This inductor allows an improvement of the output ratio of the converter. In these conditions, during the conduction period Ton of the switches SB and $SB_1$ (switches SB and $SB_1$ closed), controlled by an active state of the control signal S2, the switches SH and $SH_1$ are open. This gives an oscillating circuit comprising the output capacitor Cout in parallel with the two capacitors Ce and Cs in series with the recovery inductor $Lr_1$. The recovery inductor $Lr_1$ is computed to obtain a resonance of this oscillating circuit so that: where Ton=$\pi \cdot (Lr_1 \cdot C_{eq})^{1/2}$ where $C_{eq}$ is the equivalent capacitor of the oscillating circuit namely $C_{eq}=1/(1/Cout+1/Ce+1/Cs)$.

For an optimal result, Ton is constant and equal to approximately the half-period of the resonance frequency of the oscillating circuit.

During the transition from Toff to Ton, the current in the inductor $Lr_1$ is zero, the voltage (Vce+Vcs) at the terminals of the capacitors Ce and Cs is less than the average value of Vout and increases while passing the average value of Vout. The current in the inductor $Lr_1$ increases while storing magnetic energy, passes a maximum value when (Vce+Vcs) passes the average value of Vout, then decreases to a zero value, corresponding to the end of Ton, returning the energy to the capacitors Ce and Cs. During Toff, the current in the inductor $Lr_1$ remains zero, the sum of the voltages (Vce+Vcs) decreases because Ce and Cs are traversed by the current of the inductor Lin, then the cycle begins again at the beginning of Ton.

FIG. 1b represents the "negative" version of the voltage boost converter of FIG. 1a, that is to say by which a boosted negative voltage Vout is obtained at the output. The converter of FIG. 1b, of the same structure as that of FIG. 1a, is supplied by a generator E supplying a negative potential Vin between the input terminals E1 and E2. The polarity of the output capacitor Cout is then inverted.

In practice, such a DC DC converter is powerful and makes it possible, by providing a plurality of pairs $P_i$ of switches similar to $P_1$, each associated with a pair of input and output capacitors $Ce_i$, $Cs_i$, to obtain the desired voltage level at the output, with an optimal output ratio, with a stress distributed over the various pairs. It will be of value to refer to the text and figures of the aforementioned patent.

In many applications, positive and negative boosted voltages are necessary. This problem could be solved by the use of two single-voltage output converter structures of the prior art as described with reference to FIGS. 1a and 1b, so that one of them supplies a positive boosted voltage, the other a negative boosted voltage, from the same direct current supply low voltage. This technically powerful solution is however not optimal in terms of complexity, each single-voltage output converter having to retain its own control circuit. Relative to a single-voltage converter of the same power, a two-converter structure has a higher cost and reduced reliability.

The invention is an enhancement of the converter described in the aforementioned French patent.

Its object is a topology of a DC DC converter with two output voltages, with a high output ratio, allowing conversion ratios greater than 5, and optimized in terms of space and performance.

As claimed, the invention therefore relates to a DC DC voltage boost converter comprising a first and a second input terminals to receive a DC input voltage, an inductive stage connected between the said input terminals and comprising an inductor connected to a node in series with a switch and at least one first and one second voltage boost structure, characterized in that it comprises:
- a level translator circuit connected between the said node of the inductive stage and the input terminal connected to the electric earth and comprising a capacitor connected in series at a node to a directly connected diode;
- at least a first boost structure to supply a positive output voltage between a positive output terminal and an output terminal connected to the electric earth, the said first structure being connected between an input node formed by the said node of the inductive stage and the said positive output terminal; and comprising a first switch connected to the said input node, and $k_p$ pairs of switches in series, connected in series between the said first switch and the positive output terminal, $k_p$ being an integer equal to or greater than 1.
- at least one second boost structure to supply a negative output voltage between a negative output terminal and the said output terminal connected to the electric earth, the said second structure being connected between an input node formed by the said node of the level translator stage and the said negative output terminal, and comprising a first switch connected to the said input node, and $k_n$ pairs of switches in series connected in series between the said first switch and the positive output terminal, where $k_n$ is an integer equal to or greater than 1;
- $k_p+1$, respectively $k_n+1$ capacitors distributed between a group of input capacitor(s) and a group of output capacitor(s) associated with each pair of the first structure, respectively of the second structure;
- each pair of switches of the said first and second structure comprising a first switch and a second switch in series, controlled simultaneously and alternately one to the open state and the other to the closed state, the first switches being such that, in the closed state, they place a group of input capacitor(s) in series and a group of corresponding output capacitor(s), and the second switches being such that, in the closed state, the groups of input and output capacitors are connected in parallel between the input node of the corresponding structure and the corresponding positive or negative voltage terminal;
- and the switch of the inductive stage, the said first switch of the second structure, the said first switches of the pairs of the first structure and the said second switches of the pairs of the second structure being simultaneously controlled alternately to the open and closed state, and the said first switch of the first structure, the said second switches of the pairs of the first structure and the said first switches of the pairs of the second structure being simultaneously controlled to the opposite state.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and it several details are capable of modifications in various obvious aspects, all without departing from the invention.

Accordingly, the drawings and description thereof are to be regarded as illustrative in nature, and not as restrictive.

DETAILED DESCRIPTION OF THE DRAWING

Figure 2:
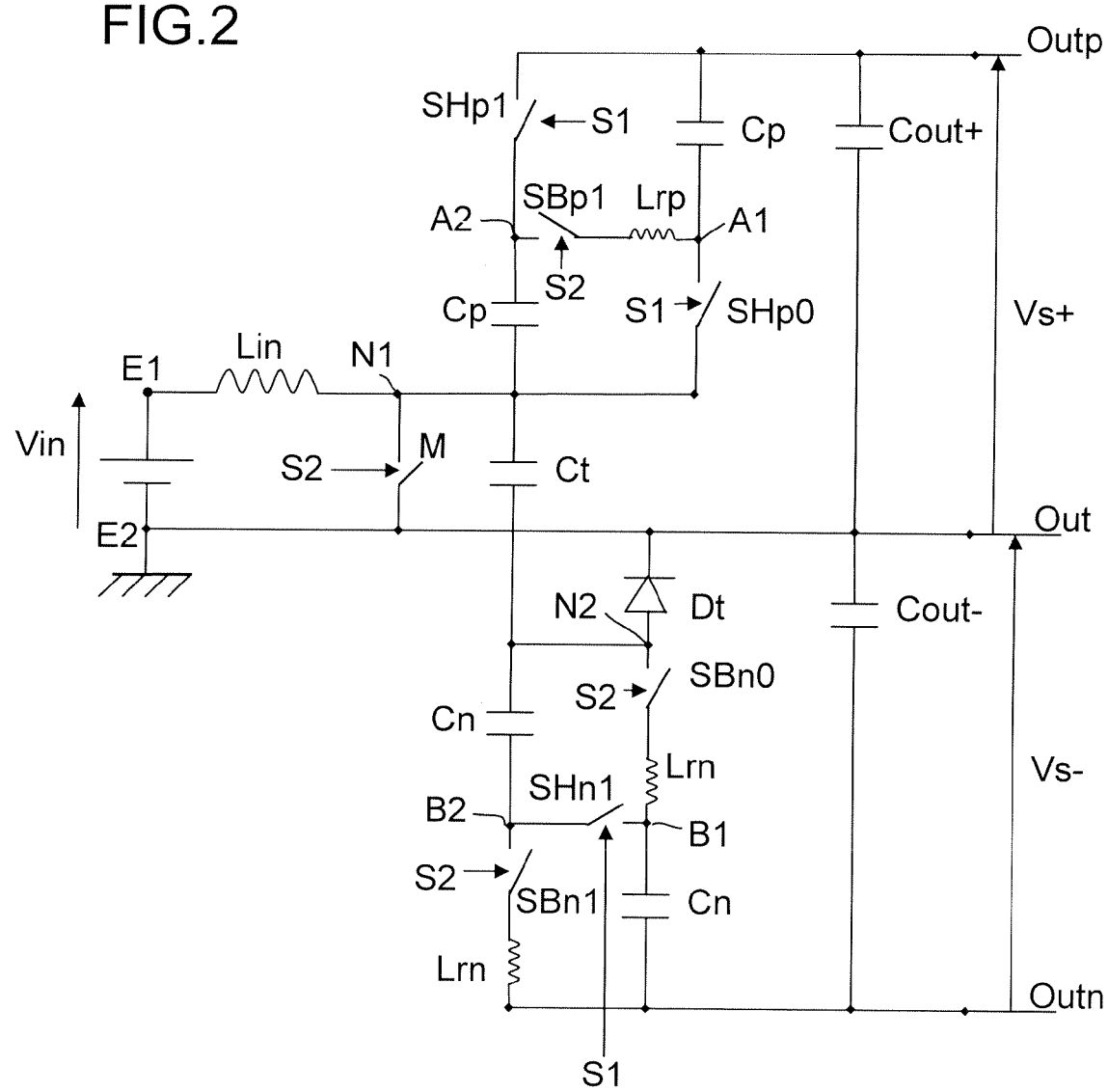
FIG. 2 illustrates a topology of a DC DC converter with two symmetrical outputs according to the invention, with one pair of additional switches for each positive and negative voltage output.

FIG. 2 illustrates a topology of a DC DC voltage converter with two boosted and regulated outputs, a positive voltage output Vs+ and a negative voltage output Vs−, with a second order cell capable of boosting an input voltage Vin of a determined value, in these two output voltages. In a practical example, it has been possible to produce a converter with a corresponding topology, which, for an input voltage Vin of between 12 and 32 volts, delivers at the output two regulated output voltages of more or less 125 volts.

A generator is connected between the input terminals E1 and E2 of the converter, in order to apply a direct current voltage Vin to its terminals. E2 is connected to the electric earth.

The converter comprises:
- an inductive input stage connected in parallel between the terminals E1 and E2, comprising an input inductor L in in series with a controlled switch M. The switch M periodically places the input inductor in parallel with the generator;
- a first output capacitor Cout+ connected in parallel respectively to output terminals Outp and Out, supplying at its terminals a positive output voltage Vs+; the output terminal Out being connected with the input terminal E2 to the electric earth;

the second output capacitor Cout- connected in parallel respectively between output terminals, Out and Outn, supplying at its terminals a negative output voltage Vs-;

a voltage level translation circuit, connected in parallel to the said controlled switch M, between a connection node N1 corresponding to the mid-point between the input inductor and the controlled switch M, and the terminal E2 connected to the electric earth. This circuit comprises a capacitor Ct and a diode Dt connected in series; a terminal of the capacitor is connected to the node N1. The cathode of the diode Dt is connected to the terminal E2, the nodes N1 and N2 forming respectively an input node for a positive, respectively negative voltage boost structure;

a positive voltage boost structure, connected between the input node N1 and the output terminal Outp;

a negative voltage boost structure, connected between the input node N2 between the capacitor and the diode of the level translation circuit and the output terminal Outn.

The switches are typically made by semiconductor transistors such as for example, and not limitingly, MOS or bipolar transistors.

In the example illustrated in FIG. 2, these structures each form a second order voltage boost cell, with three switches and two elementary capacitors of the same value, that are:

either in series between the input node of the structure in question and the output terminal not connected to the earth, via one of the switches in the closed state simultaneously with the switch M;

or in parallel, the other two switches being closed and the switch M open.

More precisely, the first structure that supplies the positive output voltage Vs+ between the terminals Outp and Out comprises:

a first controlled switch SHp0, of which one terminal is connected to the corresponding input node N1 of the structure, and a pair of switches in series SBp1, SHp1. This assembly is connected at the input to the other terminal A1 of the first switch SHp0 and at the output to the output terminal Outp not connected to the electric earth;

an elementary capacitor Cp connected in series between the mid-point A2 between the two switches of the pair SBp1, SHp1 and the input node N1 of the structure; and an elementary capacitor Cp of the same value connected in parallel to this pair SBp1, SHp1, that is to say between the output terminal Outp not connected to the electric earth and the terminal A1 of the first switch SHp0;

the control signal S1 controls the switches SHp0 and SHp1 and the control signal S2 controls the switches M and SBp1.

In a similar manner, the second structure which supplies the negative output voltage Vs- between the terminals Outn and Out comprises:

a first controlled switch SBn0, of which one terminal is connected to the corresponding input node N2 of the structure, and a pair of switches in series SBn1, SHn1, connected at the input to the other terminal B1 of the first switch SBn0 and at the output to the output terminal Outn not connected to the electric earth, and an elementary capacitor Cn connected in series between the mid-point B2 between the two switches of the pair SBn1, SHn1 and the input node N2 of the structure; and an elementary capacitor Cn of the same value connected in parallel to this pair SBn1, SHn1, that is to say between the output terminal Outn not connected to the electric earth and the terminal B1 of the first switch SBn0;

the control signal S1 controls the switch SHn1 and the control signal S2 controls the switches M, SBn0 and SBn1.

Figure 3:
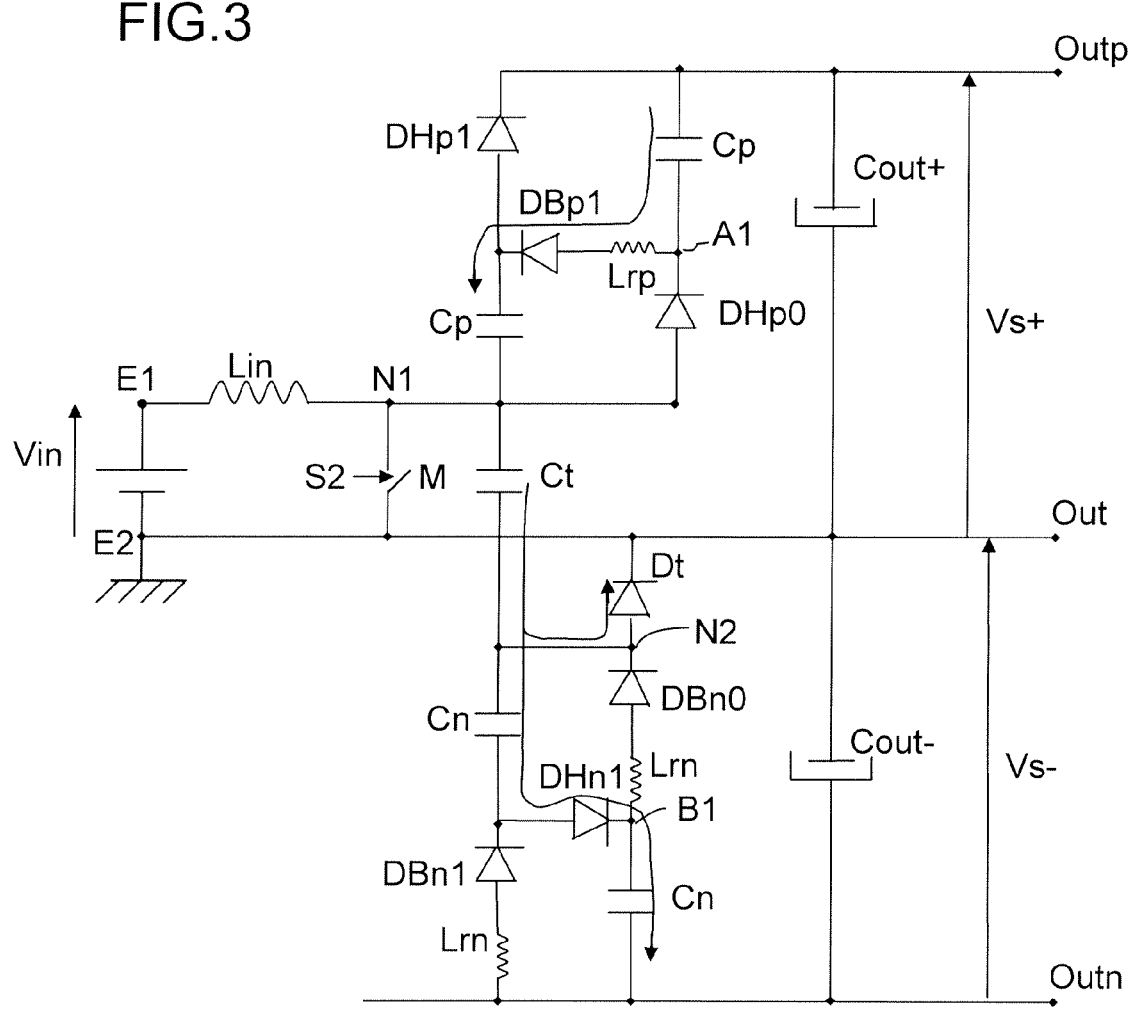
FIG. 3 illustrates a variant, in which the switches are made by diodes.

The switches SBpi, SHpi, SBni, SHni may be advantageously made by directly connected diodes DBpi, DHpi, DBni, DHni, as illustrated in FIG. 3. Only the switch M of the inductive stage remains. This simplifies the connection and makes it possible to use only one control signal S2 to place this switch alternately in the open and on state depending on the cyclic ratio $\alpha = Ton/Ton+Toff$.

The operation of the converter is such that the user has simultaneously a resonant circuit in one structure, while in the other structure, the capacitors Cp or Cn are charged in parallel. The operation of each structure alternates according to the alternately open and closed state of the switch M. Each resonant circuit forms a series circuit comprising the capacitors Cp or Cn, and the switch or the diode that connects them in series DBp1 or DHn1, between the input point of the structure in question N1 or N2 and the output not connected to the earth (FIG. 3).

Figure 1A:
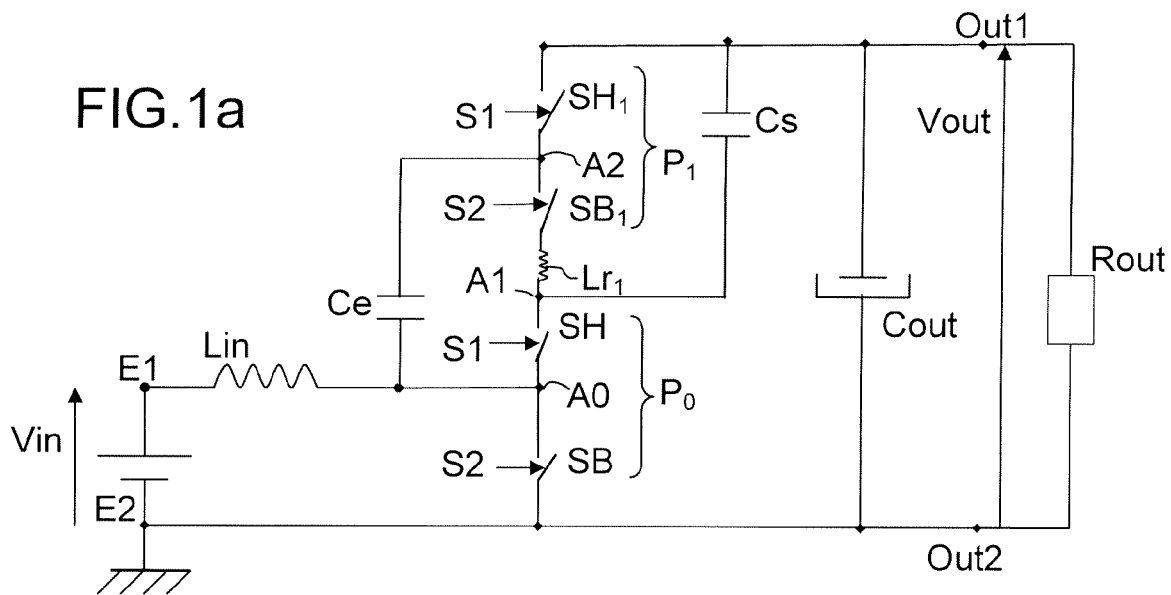
FIGS. 1a and 1b already described illustrate a single-voltage DC DC converter according to the prior art, for supplying a positive, respectively negative voltage.
Figure 1B:
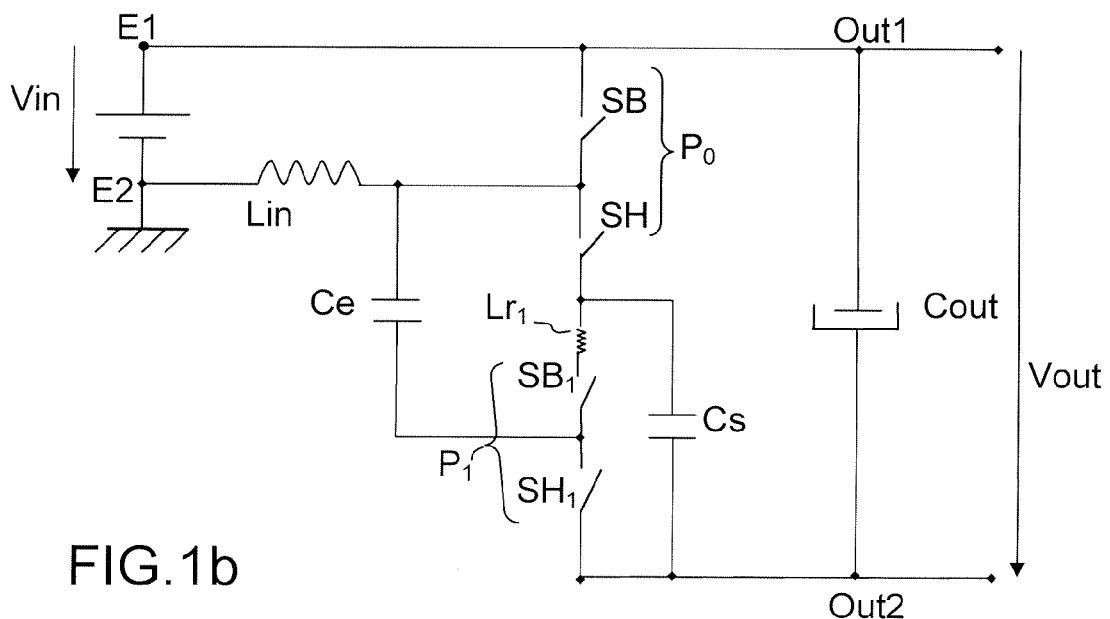

In the two structures, each pair may also comprise, advantageously, a recovery inductor, as seen in relation with the description of the prior art with reference to FIGS. 1a and 1b. In the figures therefore inductors Lrp and Lrn are provided. These recovery inductors make it possible to improve the output ratio of the two-voltage converter, as detailed in the description of the prior art with reference to the cited French patent. In the first structure, an inductor Lrp is placed on the connection path in series of the two elementary capacitors Cp. In the second structure, an inductor Lrn is placed on each of the charge paths in parallel of the two elementary capacitors Cn.

The operation of the converter is in greater detail as follows:

the voltage at N1 varies between 0 and ½Vs+: the voltage is equal to 0 when the switch M is controlled to the closed state; and at ½Vs+ when the switch M is controlled to the open state. The voltage at the terminals of each capacitor is ½Vs+. At the terminals of the capacitor Ct of the voltage translator stage, the voltage is direct current. Therefore, the voltage at N2 varies between —½ Vs (when N1 is at 0) and 0 (when N1 is at ½Vs).

Figure 4:
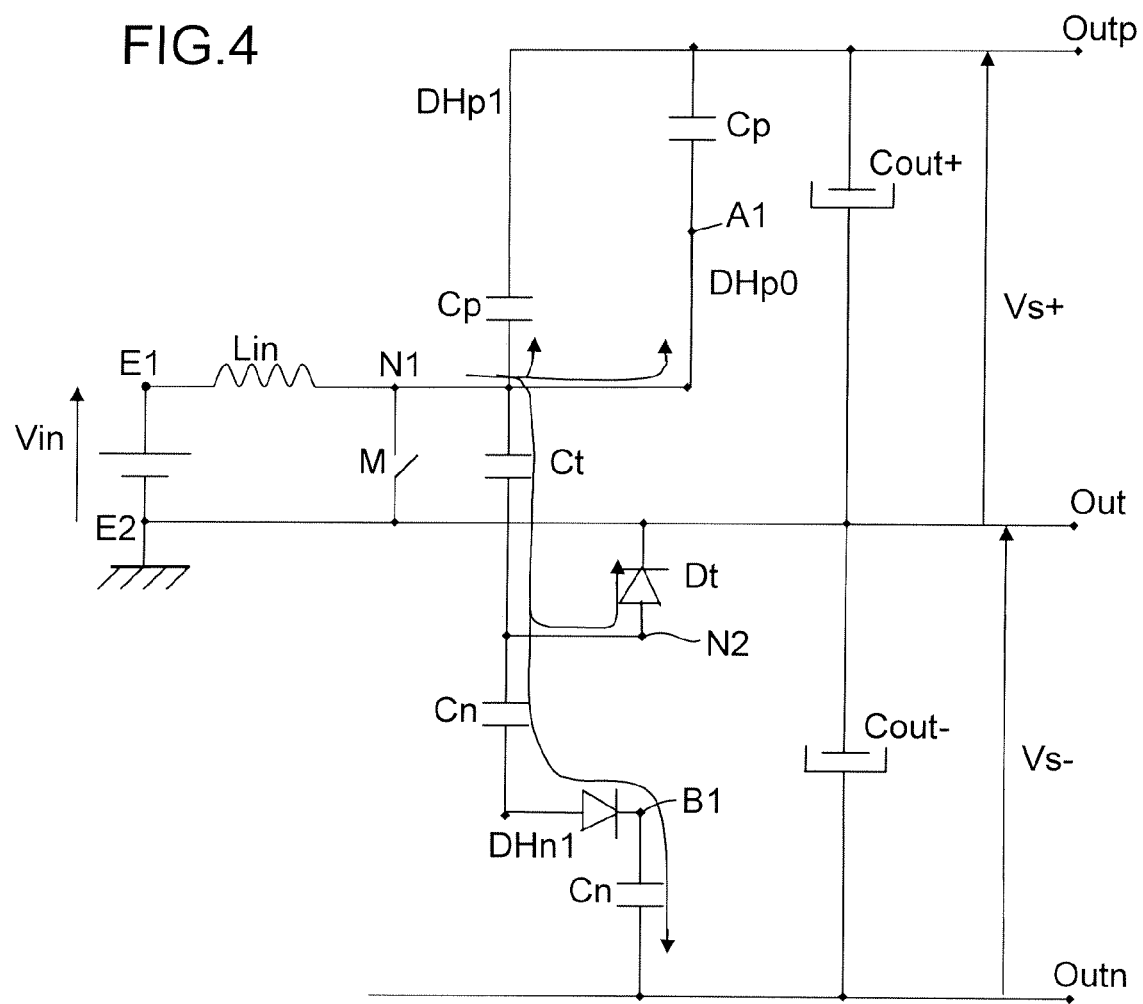
FIGS. 4 and 5 illustrate the phases corresponding to the off-state respectively on-state of the switch M.

When the switch M is controlled to the open state, N1 goes to ½Vs+. The current in the inductor Lin is divided at the node N1 into two: one portion enters the "positive" structure, and allows the charge via Cp, SHp1 (or DHp1) and SHp0 (or DHp0), Cp. The other passes via Ct and discharges the resonant circuit Ct, Cn, SHn1 (or DHn1), Cn and again passes partly into the diode Dt. The equivalent electric diagram for the case in which the transistors of the structures are diodes, as seen in FIG. 3, is illustrated in FIG. 4.

Figure 5:
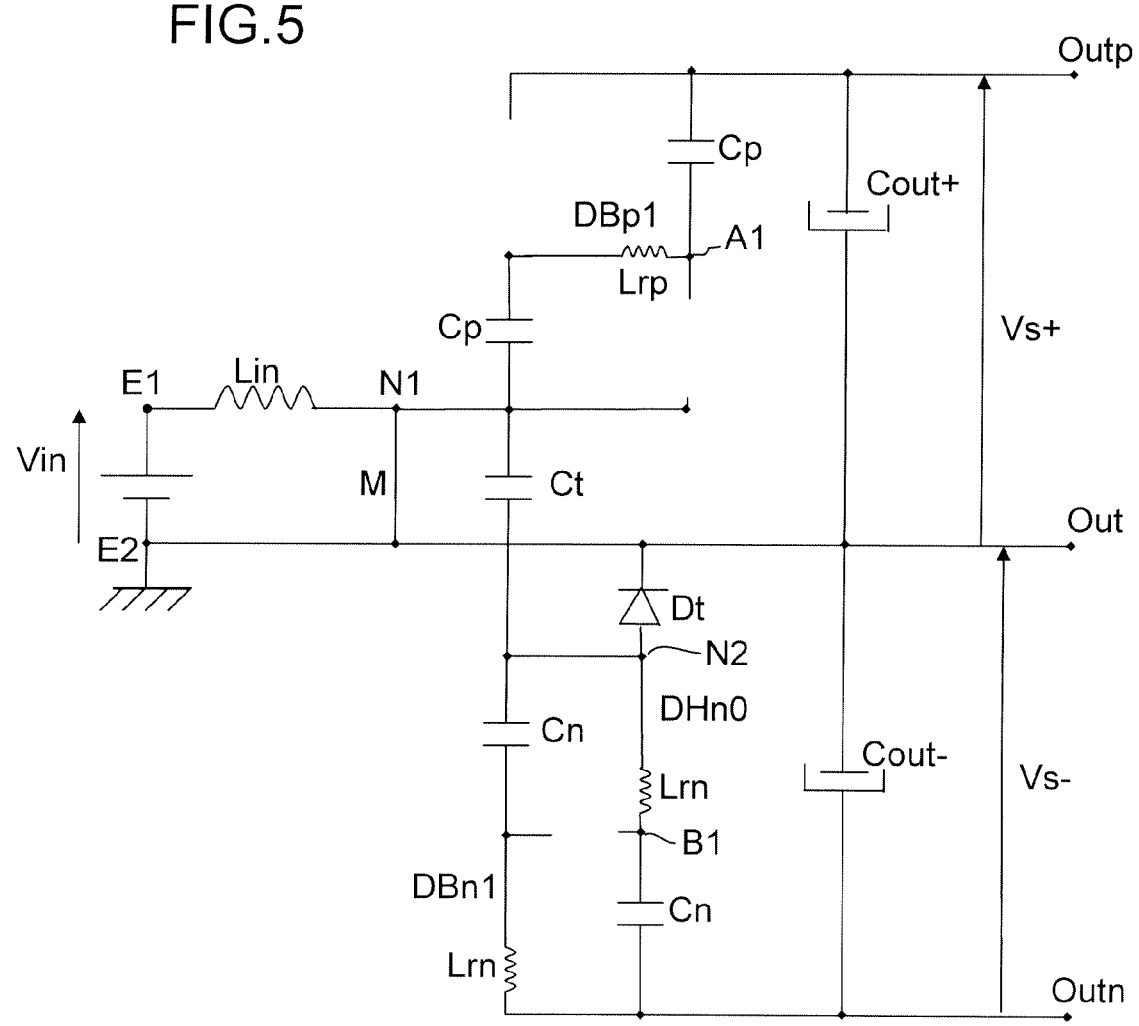

When the switch is controlled to the closed state, N1 returns to zero: this discharges the resonant circuit Cp, Sbp1 (or Dbp1), Cp of the positive structure, and charges in the second structure via Cn, SHn0 (or DHn0), Ct and SBn1 (or DBn1), Cn, Ct. The equivalent electric diagram is illustrated in FIG. 5 for the case in which the transistors of the two structures are diodes (FIG. 3).

This gives an equal distribution of the current in the various chains that are symmetrical.

Finally, symmetrical voltages Vs+=-Vs- are obtained at the output.

It will be noted that in the advantageous case, and as illustrated, in which recovery inductors Lrn, Lrp, are provided, it involves in practice inductors of very small values, whose only function is to provide an energy rebalancing without losses in the various capacitors.

The capacitor Ct is in practice dimensioned relative to the negative structure, according to the number $k_n$ of pairs of additional switches: $Ct \geq k_n.Cn$. In the example of FIG. 2, this number $k_n$ is equal to 1 and Ct is chosen to be greater than or equal to an elementary capacitor Cn.

Figure 6:
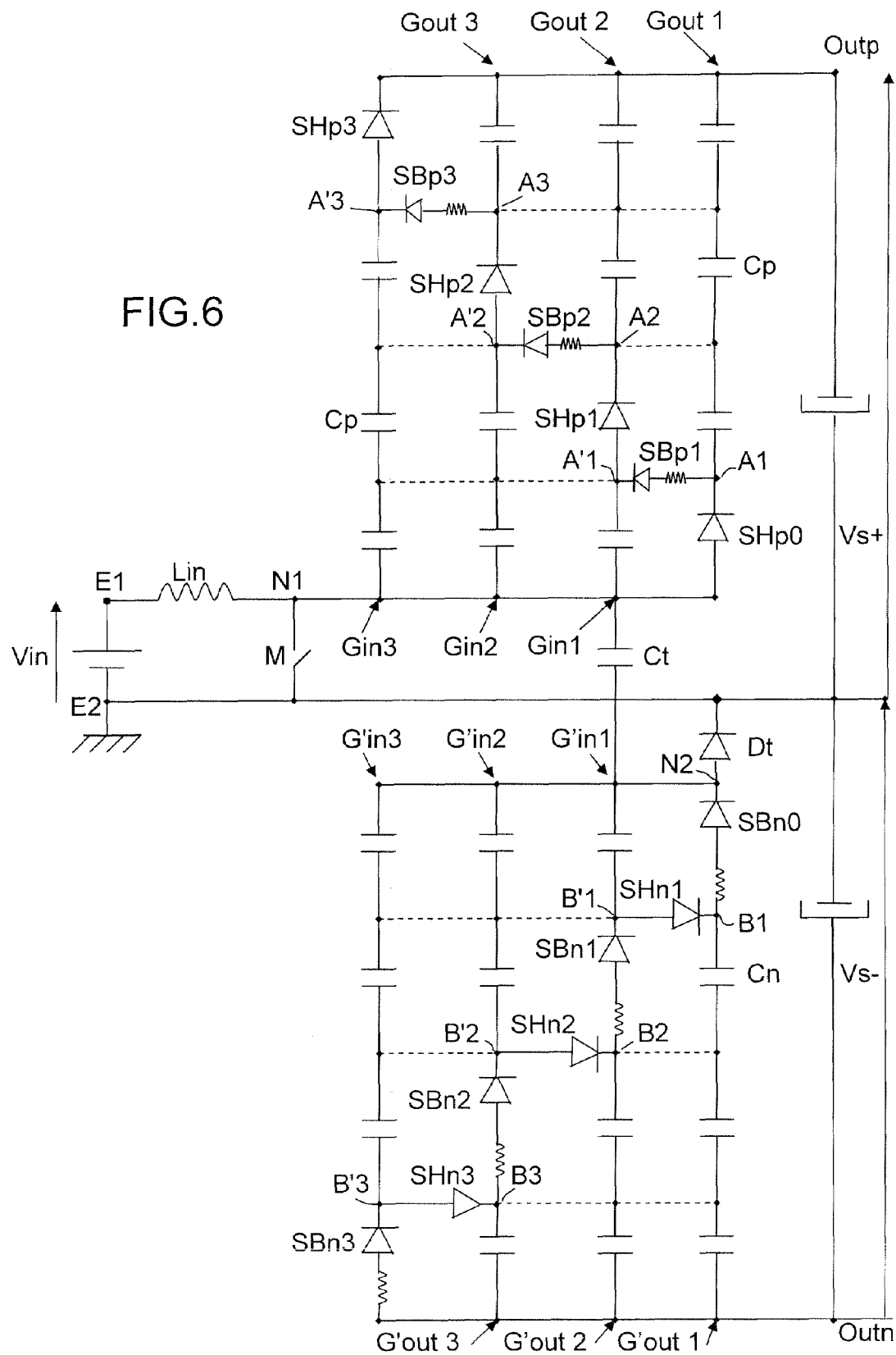
FIG. 6 illustrates a topology of a DC DC converter with two symmetrical outputs according to the invention, with three pairs of additional switches for each positive and negative voltage output.

FIG. 6 illustrates a generalization of a dual-voltage converter according to the invention, with several pairs of switches (diodes in the example) in each voltage boost structure, in order to form, with groups of associated input and output capacitors, an equal number of voltage boost cells.

The positive structure that supplies at the output a positive voltage Vs+ between the terminals Outp and Out, is connected to the input node N1. It comprises:
- a first controlled switch SHp0, connected between the corresponding input node N1, and a node A1;
- a series set of $k_p$ pairs of switches in series (SBpi, SHpi), $k_p$ being an integer greater than or equal to 1. This set is connected between the node A1 and the output terminal Outp not connected to the electric earth;
- $k_p+1$ capacitors per pair, divided into a group of input capacitor(s) Gini, and a group of output capacitor(s) Gouti, and attached to each pair of switches of rank i in the series set. More precisely, the pair connected to the node A1 is the pair of rank 1 by convention; the input group comprises i elementary capacitors Cp of the same value connected in series between the mid-point A'i between the two switches of the pair in question of rank i and the input node N1 of the structure; and the output group comprises $(k_p+1)-i$ elementary capacitors of the same value Cp connected in series between the connection node Ai of the pair in question of rank i with the next pair of rank i+1, and the output terminal Outp. This therefore gives, attached to the first pair (SBp1, SHp1), of rank i=1 with the adopted convention, an input group Gin1 comprising one elementary capacitor Cp connected between A'1 and N1, and an output group Gout1 comprising three elementary capacitors Cp connected between A1 and Outp; to the second pair (SBp2, SHp2), of rank i=2, an input group Gin2 comprising two elementary capacitors Cp connected between A'2 and N1 and an output group Gout2 comprising two elementary capacitors Cp connected between A2 and Outp; to the third pair (SBp3, SHp3), of rank i=3, an input group Gin3 comprising three elementary capacitors Cp connected between A'3 and N1 and an output group Gout3 comprising one elementary capacitor Cp connected between A3 and Outp.

The negative structure that supplies at the output a negative voltage Vs− between the terminals Outn and Out, is connected to the input node N2. It comprises in a dual manner:
- a first controlled switch SBn0, connected between a node B1 and the corresponding input node N2;
- a series set of $k_n$ pairs of switches in series (SBni, SHni), $k_n$ being an integer greater than or equal to 1 connected between the output terminal not connected to the earth Outn and the node B1;
- $k_n+1$ capacitors associated with each pair and divided into a group of input capacitor(s) G'inj, and a group of output capacitor(s) G'outj, attached to each pair of switches of rank j in the series set, and taking by convention j=1 for the first pair (SBn1, SHn1) connected to the node B1. The input group G'inj comprises j elementary capacitors Cn of the same value connected in series between the mid-point B'j between the two switches of the pair in question of rank j and the input node N2 of the structure; and the output group G'outj comprises $(k_n+1)-j$ elementary capacitors Cn of the same value connected in series between the connection node Bj of the pair in question of rank j with the next pair of rank i+1 and the output terminal Outn.

In the other two structures, each pair advantageously comprises a recovery conductor Lrn for the first structure, Lrp for the second, which improves the output ratio of the dual-voltage converter.

The switches of each pair of the two structures are simultaneously one controlled to the on-state (closed) and the other to the open state. All the switches SHpi or SHni are controlled by the same control signal S1 and all the switches SBpi and SBni and the switch M of the inductive stage are controlled by the same control signal S2, the control signals S1 and S2 being complementary, as explained with reference to FIG. 2.

In a practical embodiment, and as illustrated, the switches SHpi, SHni, SBpi and SBni are made by directly connected diodes, as already seen with reference to FIG. 3. This then gives a single line of control signal S2 to the switch M of the inductive stage, which simplifies the connector technology.

In the positive structure, the operation is as follows: when the switch M is closed for a time Ton, the input capacitors of each pair are in series with the output capacitors of each pair. When the switch M is off-state (open) for a time Toff, the input capacitors of each pair are connected to the terminal E1 through the input inductor in parallel with the output capacitors of this pair.

This gives the dual operation on the second structure.

In practice, the capacitor Ct of the voltage translation stage is dimensioned according to the number of elementary capacitors of the second structure: $Ct \geq k_n.Cn$, where $k_n$ is the number of pairs of the structure.

Figure 7:
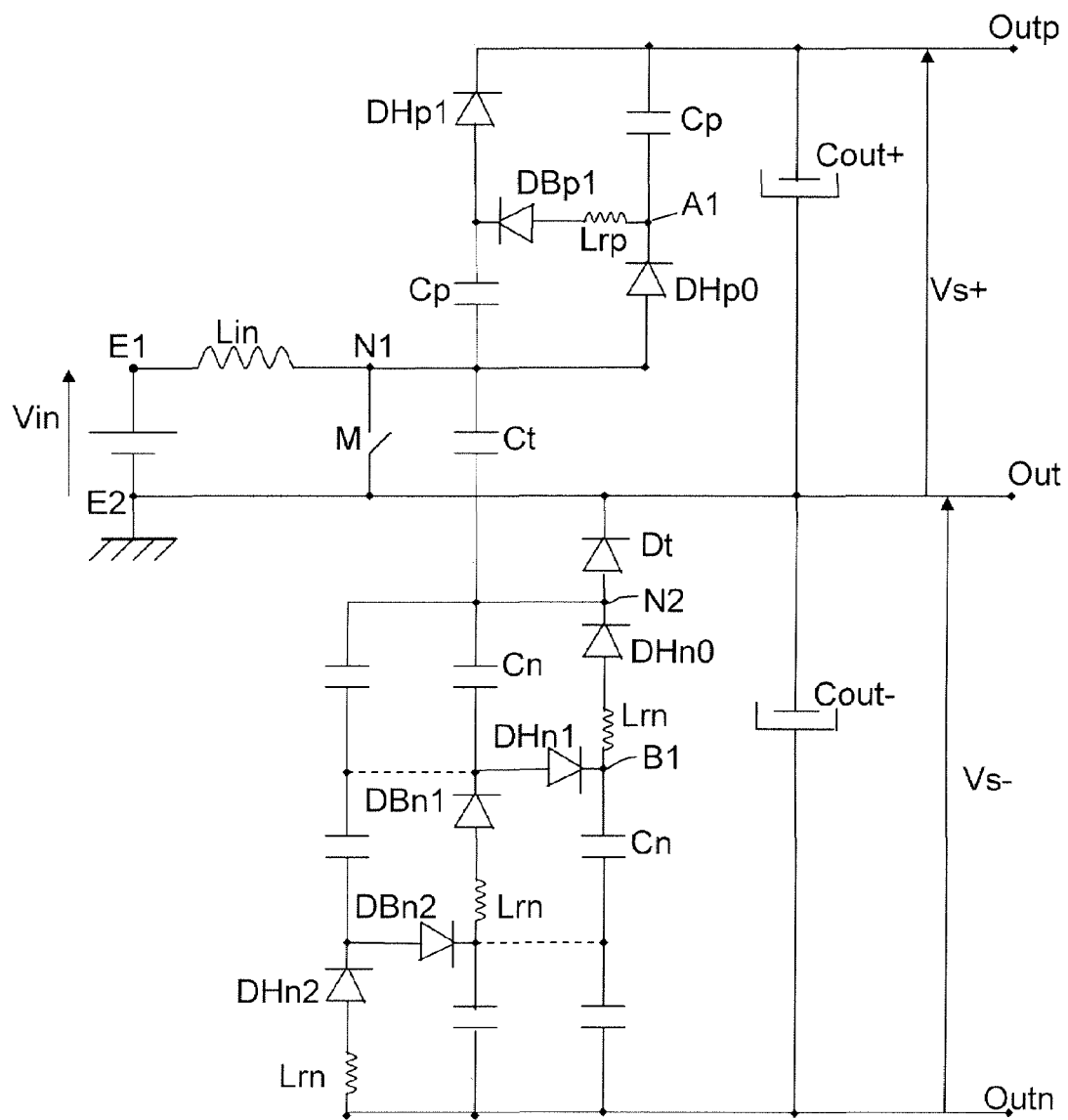
FIG. 7 illustrates a topology of a DC DC converter with two non-symmetrical outputs according to the invention, with a number of different pairs of switches for each positive and negative voltage output.

FIG. 7 illustrates the case of a non-symmetrical dual-voltage converter, that is to say where the number $k_p$ and $k_n$ of pairs of additional switches are not equal. In the example, $k_p=1$ and $k_n=2$.

Figure 8:
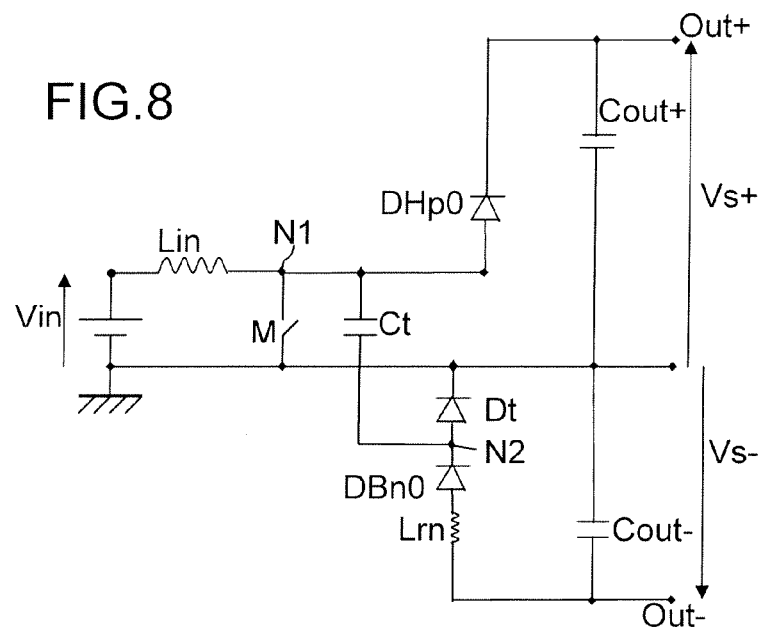
FIG. 8 illustrates a corresponding basic topology, with an additional pair of switches.

FIG. 8 illustrates the case of a converter with a first order boost cell, with no pairs of additional switches.

In these figures, and as shown in FIG. 6, the physical arrangement of the switches and capacitors is not without importance. It is shown that it allows an optimal practical embodiment in terms of occupation of surface area and of connection reliability. In this arrangement, the successive switches or diodes in the structures are placed like a step ladder and the capacitors are aligned on either side relative to these steps in a triangular network.

Furthermore, it is possible to connect the capacitors having the same voltage at their terminals, as illustrated in dashed lines in FIG. 6.

Figure 9:
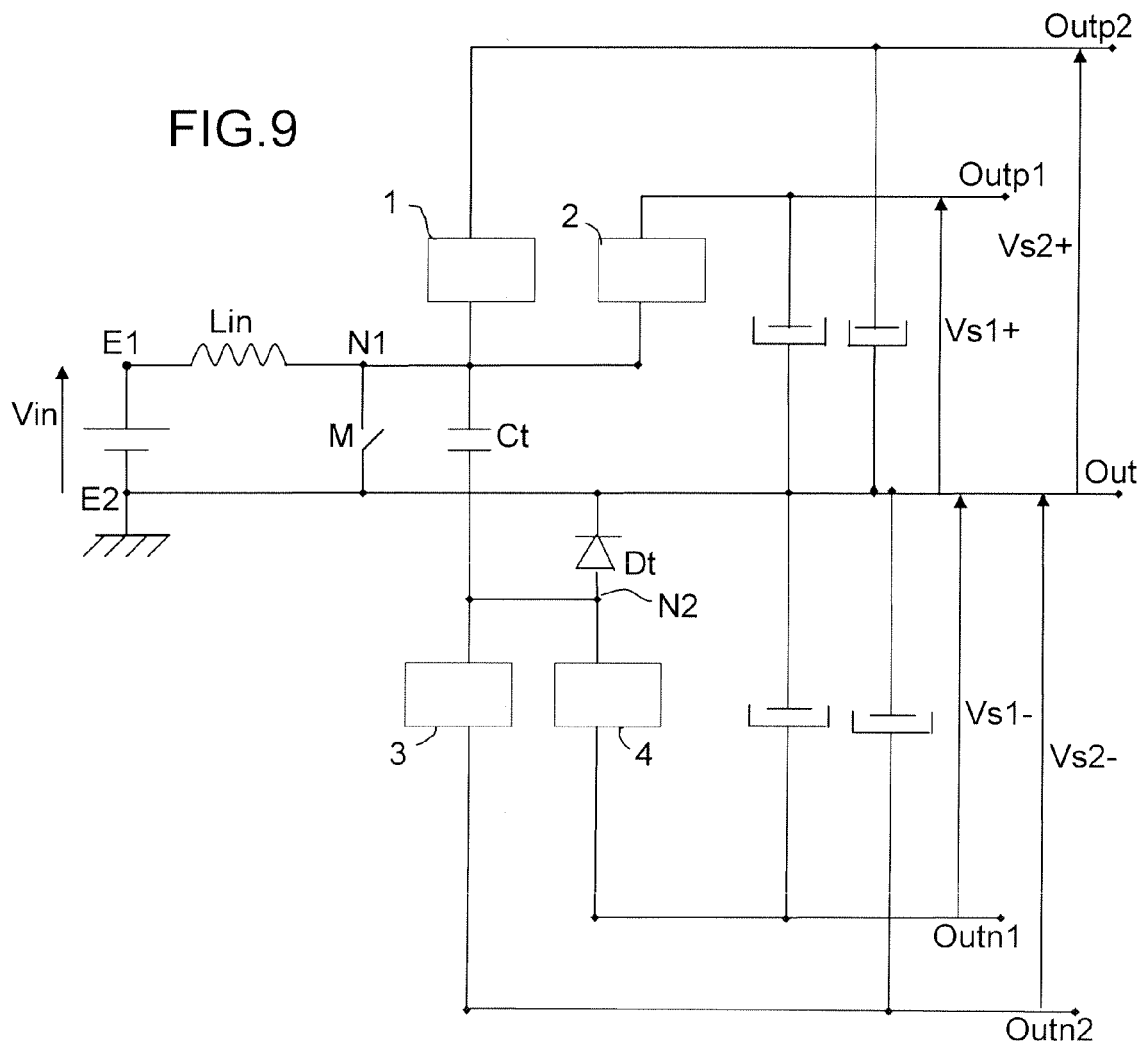
FIG. 9 illustrates a multi-voltage DC DC converter according to the invention.

It will be noted that the invention is not limited to a positive structure and a negative structure associated with an inductive stage and a voltage level translation stage. It is possible to connect a plurality of positive structures to the node N1, to supply a plurality of positive voltages $Vs+_1$, $Vs+_2$, etc., and/or a plurality of negative structures to the node N2, to supply a plurality of negative voltages $Vs+_1$, $Vs+_2$, etc., as illustrated schematically in FIG. 9. In a variant not illustrated, each negative structure has its own level translation stage. The limits of practical embodiment are essentially of a technological and dimensional nature.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as

The invention claimed is:

1. A DC DC voltage boost converter comprising a first and a second input terminals to receive a direct input voltage, an inductive stage connected between said input terminals and comprising an inductor connected to a node in series with a switch, and at least one first and one second voltage boost structure, comprising:
   a level translator circuit connected between said node of the inductive stage and the input terminal connected to the electric earth and comprising a capacitor connected in series at a node to a directly connected diode;
   at least a first boost structure to supply a positive output voltage between a positive output terminal and an output terminal connected to the electric earth, said first structure being connected between an input node formed by said node of the inductive stage and said positive output terminal; and comprising a first switch connected to said input node, and $k_p$ pairs of switches in series, connected in series between said first switch and the positive output terminal; $k_p$ being an integer equal to or greater than 1;
   at least one second boost structure to supply a negative output voltage between a negative output terminal and said output terminal connected to the electric earth, said second structure being connected between an input node formed by said node of the level translator stage and said negative output terminal, and comprising a first switch connected to said input node, and $k_n$ pairs of switches in series connected in series between said first switch and the positive output terminal, where $k_n$ is equal to or greater than 1;
   $k_p+1$, respectively $k_n+1$ capacitors distributed between a group of input capacitor(s) and a group of output capacitor(s) associated with each pair of the first structure, respectively of the second structure;
   each pair of switches of said first and second structures comprising a first switch and a second switch in series, controlled simultaneously and alternately one to the open state and the other to the closed state, the first switches being such that, in the closed state, the first switches place a group of input capacitor(s) in series and a group of corresponding output capacitor(s), and the second switches being such that, in the closed state, the groups of input and output capacitors are connected in parallel between the input node of the corresponding structure and the corresponding positive or negative voltage terminal;
   and the switch of the inductive stage, said first switch of the second structure, said first switches of the pairs of the first structure and said second switches of the pairs of the second structure being simultaneously controlled alternately to the open and closed state, and said first switch of the first structure, said second switches of the pairs of the first structure and said first switches of the pairs of the second structure being simultaneously controlled to the opposite state.

2. The converter according to claim 1, wherein the switches of the structures are directly connected diodes.

3. The converter according to claim 2, wherein each pair comprises a recovery inductor.

4. The converter according to claim 2, in that it comprises a plurality of first structures and/or of second structures connected in parallel between the input node and the corresponding voltage terminal, in order to supply a plurality of positive output voltages and/or negative output voltages.

5. The converter according to claim 2, further comprising a plurality of level translation circuits, each one associated with a second respective structure.

6. The converter according to claim 2, wherein in each structure, the first switch and the switches of the pairs are placed in series according to a step ladder design, and the elementary capacitors of the input and output groups are placed on either side and aligned on either side relative to said steps in a triangular network.

7. The converter according to claim 1, wherein each pair comprises a recovery inductor.

8. The converter according to claim 7, in that it comprises a plurality of first structures and/or of second structures connected in parallel between the input node and the corresponding voltage terminal, in order to supply a plurality of positive output voltages and/or negative output voltages.

9. The converter according to claim 7, further comprising a plurality of level translation circuits, each one associated with a second respective structure.

10. The converter according to claim 7, wherein in each structure, the first switch and the switches of the pairs are placed in series according to a step ladder design, and the elementary capacitors of the input and output groups are placed on either side and aligned on either side relative to said steps in a triangular network.

11. The converter according to claim 1, in that it comprises a plurality of first structures and/or of second structures connected in parallel between the input node and the corresponding voltage terminal, in order to supply a plurality of positive output voltages and/or negative output voltages.

12. The converter according to claim 11, wherein in each structure, the first switch and the switches of the pairs are placed in series according to a step ladder design, and the elementary capacitors of the input and output groups are placed on either side and aligned on either side relative to said steps in a triangular network.

13. The converter according to claim 1, further comprising a plurality of level translation circuits, each one associated with a second respective structure.

14. The converter according to claim 13, wherein in each structure, the first switch and the switches of the pairs are placed in series according to a step ladder design, and the elementary capacitors of the input and output groups are placed on either side and aligned on either side relative to said steps in a triangular network.

15. The converter according to claim 1, wherein in each structure, the first switch and the switches of the pairs are placed in series according to a step ladder design, and the elementary capacitors of the input and output groups are placed on either side and aligned on either side relative to said steps in a triangular network.

* * * * *